United States Patent [19]

Wells

[11] Patent Number: 4,675,944
[45] Date of Patent: Jun. 30, 1987

[54] PNEUMATIC MEAT SAW

[76] Inventor: Daryl F. Wells, 11035 Mollerus Dr., Apt. 304, St. Louis, Mo. 63138

[21] Appl. No.: 840,020

[22] Filed: Mar. 17, 1986

[51] Int. Cl.⁴ ............................................. A22B 5/20
[52] U.S. Cl. ....................................... 17/23; 30/392; 83/639; 227/9
[58] Field of Search ................. 30/392, 166 R; 227/9; 17/23; 83/639

[56] References Cited

U.S. PATENT DOCUMENTS

| | | | |
|---|---|---|---|
| 1,704,641 | 3/1929 | Weed | 30/392 |
| 2,808,083 | 10/1957 | Miller | 30/392 |
| 3,155,011 | 11/1964 | Hyskell | 30/392 |
| 3,640,280 | 2/1972 | Slanker | 128/317 |

FOREIGN PATENT DOCUMENTS 1411869  8/1965  France .................................. 30/392

Primary Examiner—Willie G. Abercrombie
Attorney, Agent, or Firm—Zarley, McKee, Thomte, Voorhees & Sease

[57] ABSTRACT

A pneumatic meat saw including an on-off valve which is actuated to allow air flow to either side of a disk in a shuttle valve. The shuttle valve controls the flow of air to opposite sides of a piston which is operatively connected to a drive shaft which has the saw blade secured thereto. The shuttle valve causes the piston to be reciprocated which in turn causes the saw blade to be reciprocated.

3 Claims, 10 Drawing Figures

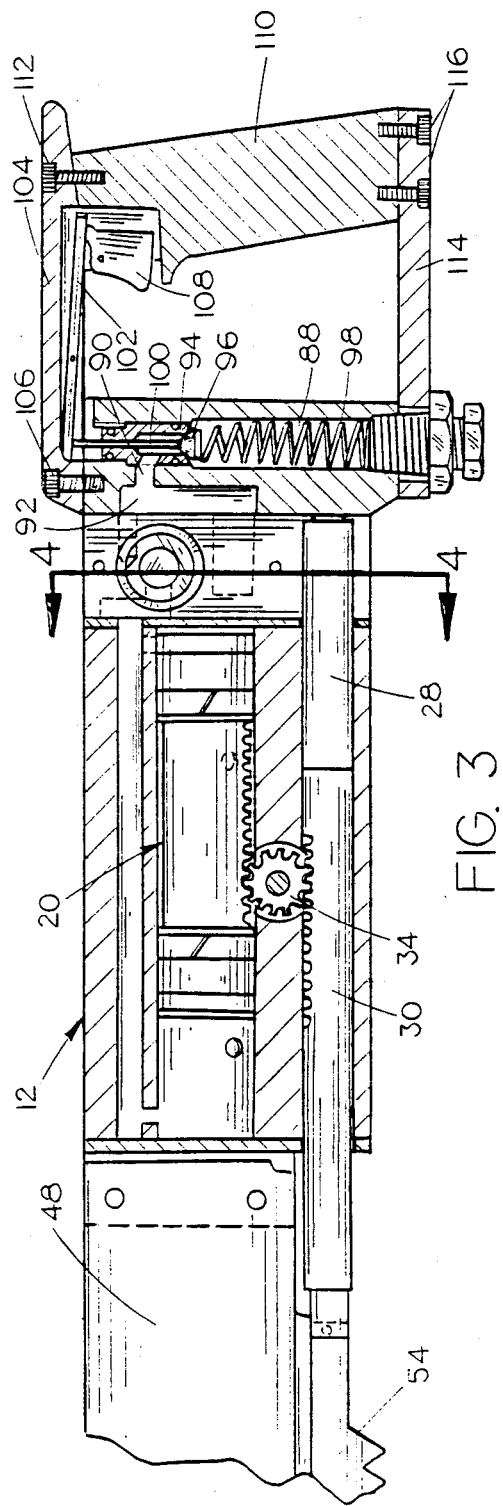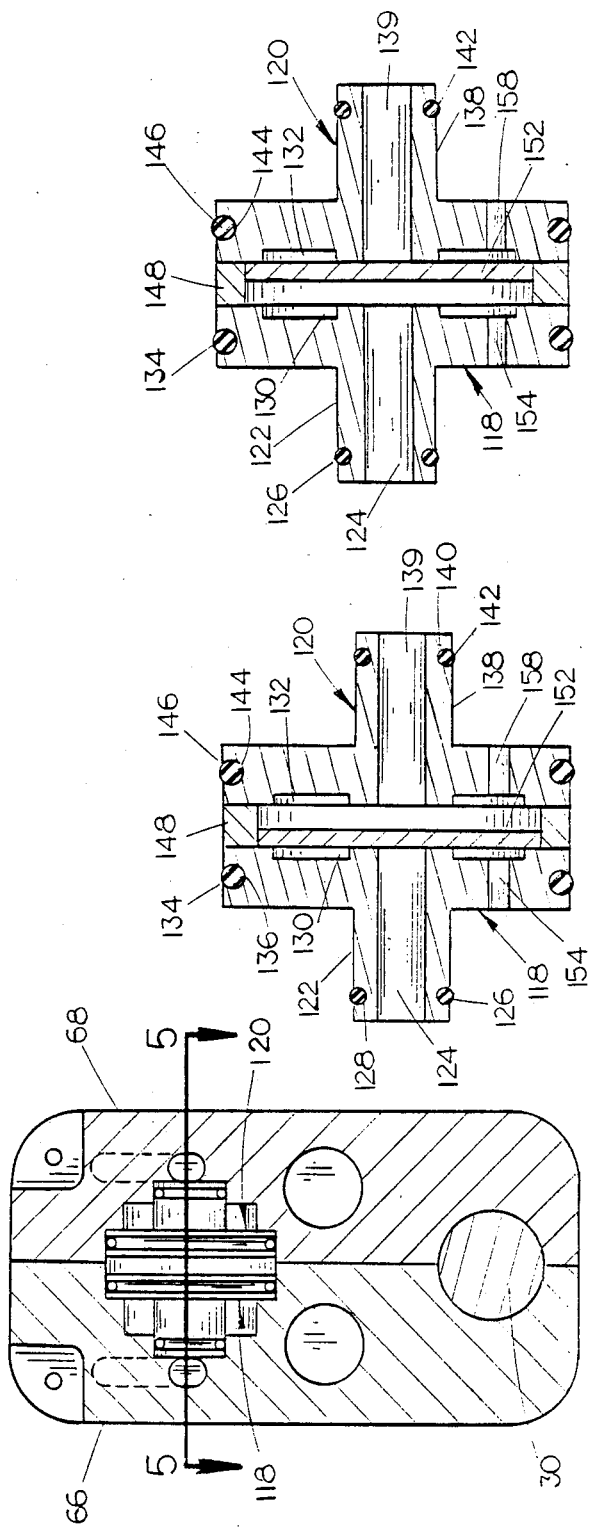

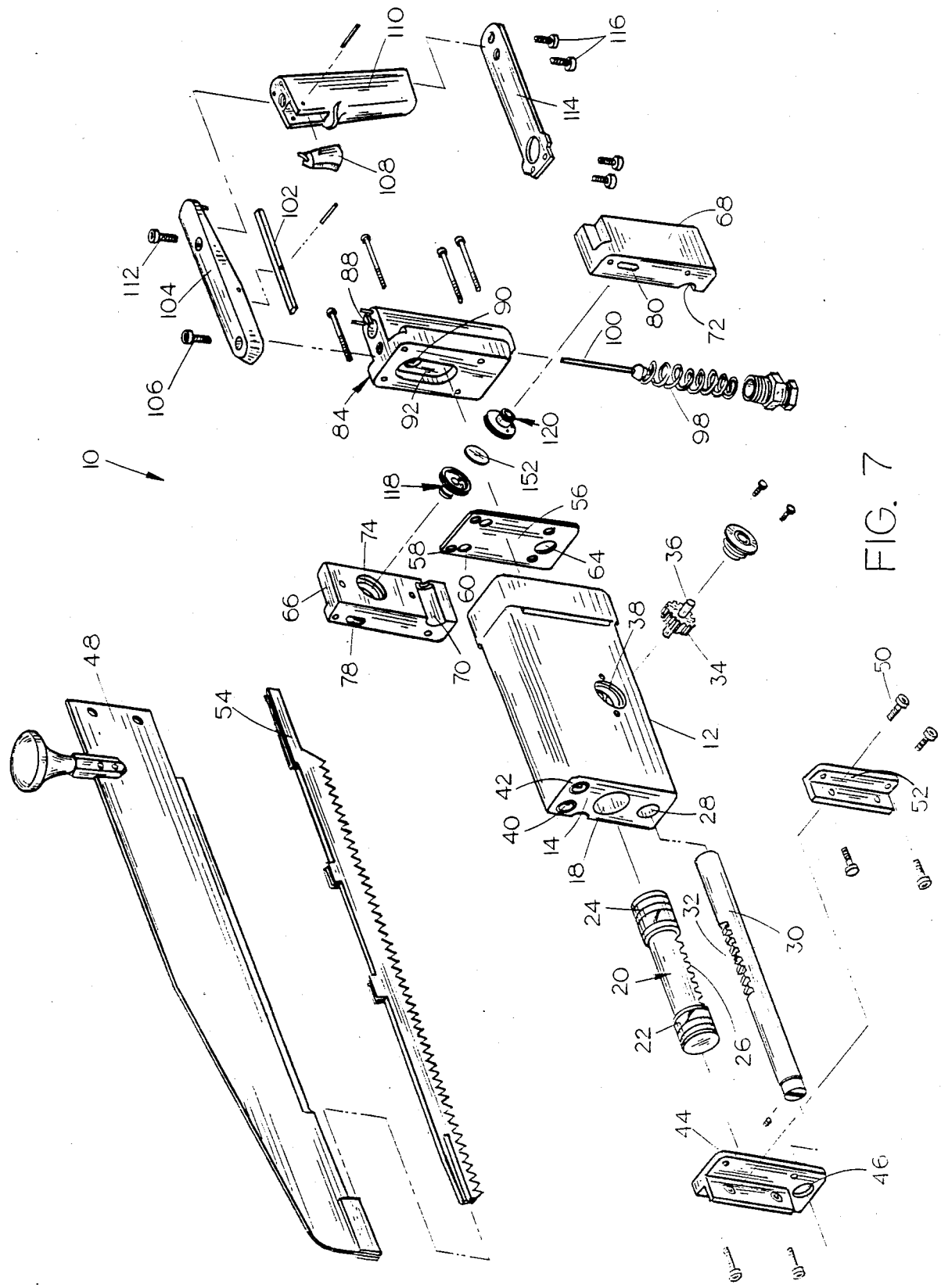

PNEUMATIC MEAT SAW

BACKGROUND OF THE INVENTION

This invention relates to a pneumatic saw and more particularly to a pneumatic saw for use in splitting meat carcasses.

Many types of pneumatic saws have been previously provided. A major disadvantage in a majority of the pneumatic saws is that they are under powered or that they are only powered in one direction. A further shortcoming of the prior art saws is that they tend to stall in use. Other disadvantages of the prior devices are that they are cumbersome, noisy and are not durable.

Therefore, it is a principal object of the invention to provide an improved pneumatic meat saw.

A further object of the invention is to provide a pneumatic saw which may be used to split or cut meat carcasses.

Yet another object of the invention is to provide a pneumatic meat saw which is reliable.

Yet another object of the invention is to provide a pneumatic meat saw which is extremely powerful.

Still another object of the invention is to provide a pneumatic meat saw which will not stall and which is not unduly noisy.

Still another object of the invention is to provide a pneumatic saw which is durable.

These and other objects will be apparent to those skilled in the art.

BRIEF DESCRIPTION OF THE DRAWINGS

FIG. 3 is a partial longitudinal sectional view of the saw:

FIG. 4 is a sectional view of the saw as seen on lines 4—4 of FIG. 3:

FIG. 5 is an enlarged sectional view as seen on lines 5—5 of FIG. 4:

FIG. 6 is a sectioal view identical to FIG. 5 except that the disk in the valve has moved from the position of FIG. 5:

FIG. 7 is an exploded perspective view of the saw of this invention:

SUMMARY OF THE INVENTION

Figure 1:
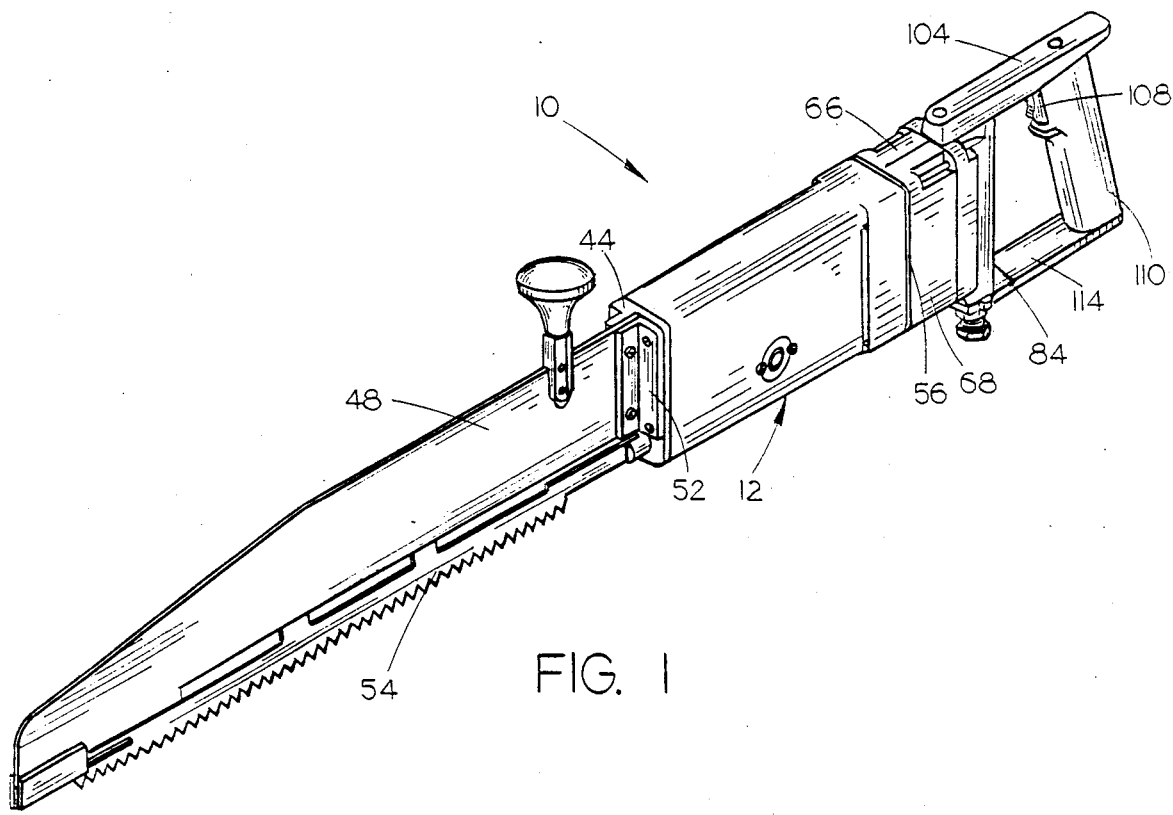
FIG. 1 is a perspective view of the meat saw of this invention.
Figure 2:
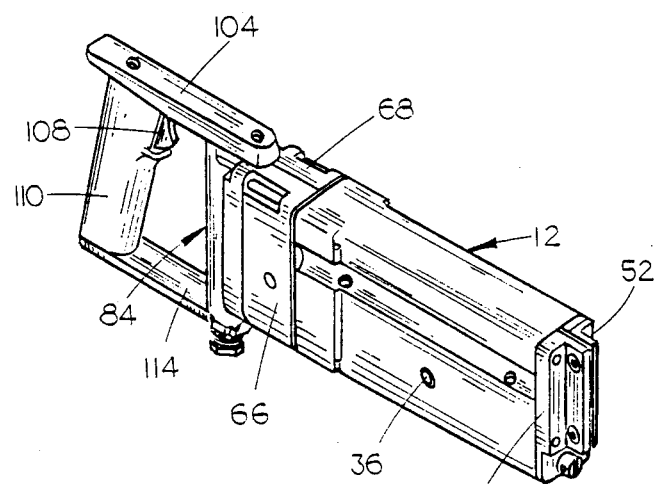
FIG. 2 is a partial perspective view of the meat saw of this invention with the blade support and blade removed therefrom.

The saw of this invention includes an on-off valve which is actuated to allow air flow to either side of a disk in a shuttle valve. With the disk in the shuttle valve in a first position, air flows through the valve and into one end of a cylinder having a piston movable mounted therein. The piston is operatively connected by a pinion to a drive shaft which has the saw blade operatively connected thereto. The air entering the cylinder causes the piston to move to a first position which causes the saw blade to be moved in a first direction. As the piston moves to its first position, the piston cuts off an air inlet to the piston. Air is trapped between the end of the piston and the end of the cylinder which stops and cushions the travel of the piston. The trapped air acts as a spring and causes the piston to reverse direction. At the same time, the piston opens an exhaust port which allows air flow through the other side of the shuttle valve. A restriction causes pressure on the other side of the disk to drop and pressure on the first side of the disk to move the disk to the other side of the valve. Air is now able to flow into the end of the cylinder and move the piston to the left. The piston continues to oscillate back and forth as does the disk in the shuttle valve until the on-off vlave is moved to the off position.

DESCRIPTION OF THE PREFERRED EMBODIMENT

The saw of this invention is referred to generally by the reference numeral 10. Saw 10 includes housing 12 having a forward end 14 and a rearward end 16. Housing 12 has an elongated bore 18 formed therein in which elongated piston 20 is movable mounted. Piston 20 is provided with seals 24 and bearing 22 at its opposite ends and gear teeth 26 positioned therebetween. Housing 12 is also provided with an elongated bore 28 formed therein in which drive shaft 30 is movably mounted. Drive shaft 30 has a plurality of teeth 32 formed therein which receive the teeth of pinion 34 which is mounted on shaft 36. Pinion 34 is rotatable mounted in bore 38 of housing 12 and is in engagement with the gear teeth 26 of piston 20. Housing 12 is also provided with elongated reservoirs, bores or tubes 40 and 42 as will be described in more detail hereinafter.

The forward end of housing 12 has a front end cap 44 mounted thereon which has an opening 46 formed therein through which shaft 30 extends. Blade support 48 is secured to end cap 44 by means of screws 50 and angle support 52. Blade 54 is slidably mounted on blade support 48 as illustrated in the drawings.

Plate 56 is secured to the rearward end of housing 12 and is provided with a plurality of screw openings 58, reservoir openings 60 and 62 which communicate with reservoirs 40 and 42 respectively, and opening 64 which communicates with bore 28.

Positioned rearwardly of and secured to plate 56 are valve blocks 66 and 68. Valve blocks 66 and 68 are provided with semi-cylindrical bores 70 and 72 formed therein respectively which cooperate to form the cylindrical bore which receives drive shaft 30. Valve block 66 is provided with bore 74 formed therein which is in communication with bore 76 (not shown) formed in valve block 68. Valve block 66 is also provided with a bore 78 formed therein which communicates with the end of bore 74 and bore 40. Valve block 68 is provided with a bore 80 formed therein which is in communication with bore 76 and bore 42. Shuttle valve 82, the details of which will be described in more detail hereinafter, is mounted in bores 74 and 76.

Air inlet block 84 is secured to housing 12, plate 56 and valve blocks 66 and 68 by screws 86 and includes a vertically disposed bore 88 formed therein which has a bore 90 extending laterally therefrom which communicates with chamber 92 formed in the front portion thereof. Bore 88 has a valve seat 94 formed therein as illustrated in FIG. 3. Valve 96 is movable mounted in bore 88 and is adapted to close valve seat 94 at times. Spring 98 yieldably urges valve 96 into seating engagement with valve seat 94. Valve stem 100 is secured to valve 96 and has a lever 102 in operative engagement with the upper end thereof. Lever 102 is positioned in top plate 104 which is secured to air inlet block 84 by screw 106. Trigger 108 is operatively secured to lever 102 and is pivotally mounted in handle 110 which is secured to top plate 104 by screw 112. Bottom plate 114 is secured to handle 110 as illustrated in FIG. 3 by screws 116.

Figure 8:
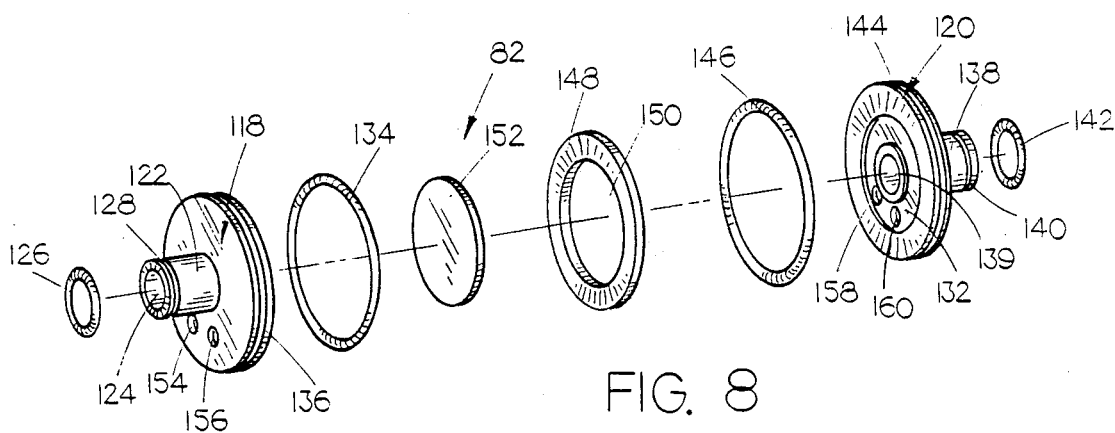
FIG. 8 is an exploded perspective view of the valve of this invention.
Figure 9:
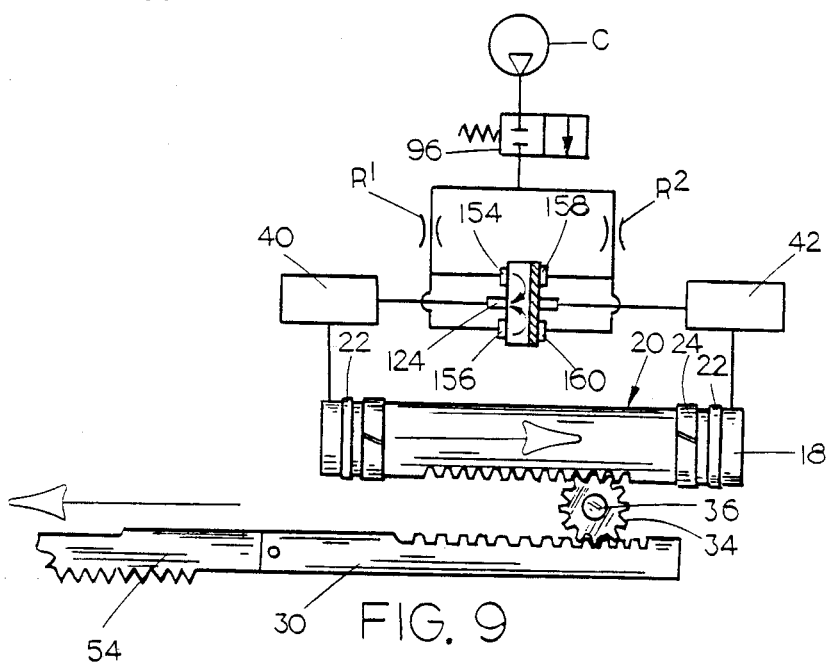
FIG. 9 is a schematic view of the circuitry of the invention.

As seen in FIG. 8, shuttle valve 82 includes valve portions 118 and 120. Valve portion 118 comprises shank portion 122 having bore 124 extending therethrough. Seal 126 is mounted in groove 128 on shank portion 122. The inner face of valve portion 118 has an annular recessed portion 130 formed therein which is identical to recessed portion 132 formed in the inner face of valve portion 120. Seal or O-ring 134 is mounted in groove 136 on valve portion 118 as illustrated. Valve portion 120 is similarly provided with shank portion 138, bore 139, groove 140, seal 142, groove 144 and O-ring 146. Spacer ring 148 having opening 150 formed therein is positioned between valve portions 118 and 120 and receives movable disk 152 therein. Valve portion 118 is provided with bores 154 and 156 formed therein while valve portion 120 is provided with bores 158 and 160 formed therein.

To utilize the saw, the trigger 108 is depressed which causes valve 94 to open so that air passes, from the compressor C, therethrough. When valve 96 is opened, air may flow to either side of the disk 152 in shuttle valve 82. With the disk in the position of FIG. 6, air will flow through the valve 82, reservoir 40 and into the left end of the cylinder or bore 18. The piston 20 will be moved to the right cutting off the air inlet to the right end of the piston. The air trapped between the right inlet and the end of the cylinder stops and cushions the travel of the piston. The trapped air acts as a spring and assists the piston to reverse its direction. At the same time, the opposite or left end of the piston opens the exhaust port allowing high air flow through the left side of the shuttle valve. The restriction $R_1$ causes pressure on the left side of the disk to drop and pressure on the right side of the disk to move the disk to the left side of the valve. Air is now able to flow into the right end of the cylinder and move the piston to the left. The piston continues to oscillate back and forth as does the disk in the shuttle valve until the on-off valve is moved to the off position. Reciprocating or oscillating movement of the piston causes the drive shaft 30 to be oscillated thereby reciprocating the blade 54 with respect to the blade support 48.

Figure 10:
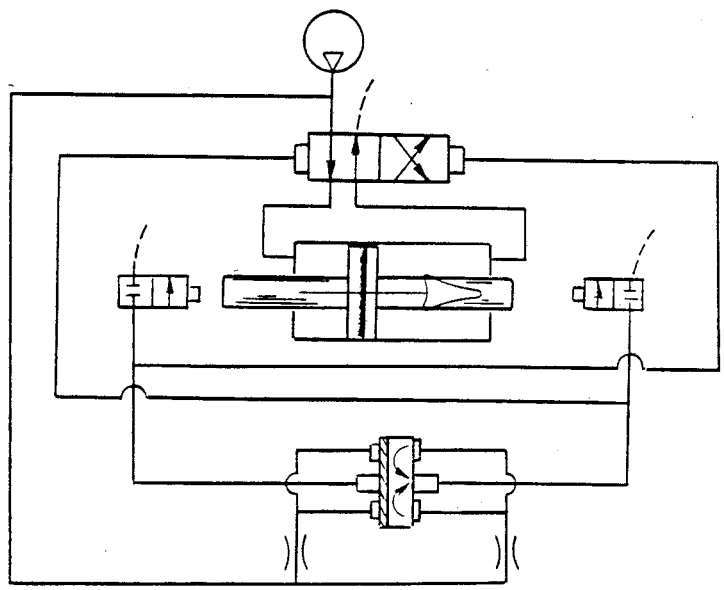
FIG. 10 is a schematic view similar to that of FIG. 10 except that the circuitry is used to power an air motor rather than a saw.

The embodiment shown in FIG. 10 is essentially identical to that previously described except that the shuttle valve controls an air-operated four-way valve which in turn controls a very large reciprocating air motor rather than a piston connected to a drive shaft pinion arrangement.

Thus it can be seen that a novel pneumatic meat saw has been provided which accomplishes at least all of its stated objectives.

I claim:
1. A pneumatic saw comprising,
   a body portion having a first elongated bore formed therein, an elongated piston movably mounted therein and having seals at its opposite ends, said piston having a gear rack formed therein, a pinion rotatably mounted in said body portion in engagement with said gear rack, a second elongated bore formed in said body parallel to said first bore, a drive shaft longitudinally reciprocatably movably mounted in said second bore and having a gear rack provided therein which is in engagement with said pinion whereby movement of said piston will cause movement of said drive shaft,
   a saw blade operatively connected to said drive shaft,
   a shuttle valve means in operative communication with opposite ends of said first bore for alternately supplying air under pressure to said opposite ends of said first bore whereby said piston will be reciprocated,
   and a manually operable on-off valve mounted in said body having an inlet end in communication with a source of air under pressure and its discharge end in communication with said shuttle valve.
2. The saw of claim 1 wherein said shuttle valve comprises a movable shuttle disk assembly which alternately supplies air under pressure to said opposite ends of said bore.
3. A pneumatic saw comprising,
   a body portion having an elongated drive shaft reciprocatably movably mounted therein, said drive shaft operatively connected to a source of air under pressure for reciprocating the same,
   an elongated cylinder having first and second ends,
   an elongated piston movably mounted in said cylinder and having seals at its opposite ends which sealably engage the walls of the cylinder,
   a saw blade operatively connected to said drive shaft,
   a shuttle valve means in operative communication between said source of air under pressure and said cylinder,
   a first air inlet in communication with said shuttle valve and said cylinder adjacent said first end thereof,
   a second air inlet in communication wit said shuttle valve and said cylinder adjacent said second end thereof,
   one end of said cylinder extending beyond said first air inlet and defining a first air spring means at one end of said piston,
   said second end of said cylinder extending beyond said second air inlet and defining a second air spring means at the other end of said piston,
   said first and second air spring means assisting in the return of the piston when the piston is stopped and started in the opposite direction at each end of its stroke,
   and a manually operable on-off valve mounted on said body portion for controlling the flow of air to said shuttle valve.

* * * * *